(12) United States Patent
Moisanen et al.

(10) Patent No.: US 10,813,161 B2
(45) Date of Patent: Oct. 20, 2020

(54) APPARATUSES AND METHODS FOR PROTECTION OF AN INITIAL NON-ACCESS STRATUM (NAS) MESSAGE

(71) Applicant: MediaTek Singapore Pte. Ltd., Singapore (SG)

(72) Inventors: Matti Moisanen, Oulu (FI); Jaakko Sitomaniemi, Oulu (FI); Jarkko Eskelinen, Oulu (FI)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 0 days.

(21) Appl. No.: 16/293,781

(22) Filed: Mar. 6, 2019

(65) Prior Publication Data

US 2019/0281649 A1 Sep. 12, 2019

Related U.S. Application Data

(60) Provisional application No. 62/657,992, filed on Apr. 16, 2018, provisional application No. 62/639,041, filed on Mar. 6, 2018.

(51) Int. Cl.
| | |
|---|---|
| *H04W 76/27* | (2018.01) |
| *H04W 8/08* | (2009.01) |
| *H04W 80/10* | (2009.01) |
| *H04W 88/02* | (2009.01) |

(52) U.S. Cl.
CPC .......... *H04W 76/27* (2018.02); *H04W 8/08* (2013.01); *H04W 80/10* (2013.01); *H04W 88/023* (2013.01)

(58) Field of Classification Search
CPC ..... H04W 76/27; H04W 80/10; H04W 88/02; H04W 88/023; H04W 8/08
See application file for complete search history.

(56) References Cited

U.S. PATENT DOCUMENTS

| | | |
|---|---|---|
| 2013/0065512 A1 | 3/2013 | Gunnarsson et al. |
| 2018/0270666 A1* | 9/2018 | Lee ............ H04L 9/3242 |
| 2019/0174449 A1* | 6/2019 | Shan ........... H04W 60/04 |
| 2019/0274051 A1* | 9/2019 | Li .............. H04W 12/0013 |

FOREIGN PATENT DOCUMENTS

| | | |
|---|---|---|
| CN | 101483865 A | 7/2009 |
| CN | 102740287 A | 10/2012 |
| CN | 102833739 A | 12/2012 |

* cited by examiner

*Primary Examiner* — Kashif Siddiqui
(74) *Attorney, Agent, or Firm* — McClure, Qualey & Rodack, LLP

(57) ABSTRACT

A User Equipment (UE) including a wireless transceiver and a controller is provided. The wireless transceiver performs wireless transmission and reception to and from a service network. The controller transitions the UE from a Radio Resource Control (RRC) idle state to an RRC connected state, and after transitioning the UE from the RRC idle state to the RRC connected state, sends an initial Non-Access Stratum (NAS) message comprising a limited set of Information Elements (IEs) in cleartext, which are required to establish security between the UE and the service network, and a container IE carrying an initial NAS message Protocol Data Unit (PDU) ciphered with NAS security context to the service network via the wireless transceiver.

14 Claims, 4 Drawing Sheets

APPARATUSES AND METHODS FOR PROTECTION OF AN INITIAL NON-ACCESS STRATUM (NAS) MESSAGE

CROSS REFERENCE TO RELATED APPLICATIONS

This Application claims priority of U.S. Provisional Application No. 62/639,041, filed on Mar. 6, 2018, the entirety of which is incorporated by reference herein. Also, this Application claims priority of U.S. Provisional Application No. 62/657,992, filed on Apr. 16, 2018, the entirety of which is incorporated by reference herein.

BACKGROUND OF THE APPLICATION

Field of the Application

The application generally relates to Non-Access Stratum (NAS) security mechanisms, and more particularly, to apparatuses and methods for protection of an initial Non-Access Stratum (NAS) message.

Description of the Related Art

In a typical mobile communication environment, a User Equipment (UE) (also called Mobile Station (MS)), such as a mobile telephone (also known as a cellular or cell phone), or a tablet Personal Computer (PC) with wireless communications capability, may communicate voice and/or data signals with one or more service networks. The wireless communications between the UE and the service networks may be performed using various cellular technologies, including the Global System for Mobile communications (GSM) technology, the General Packet Radio Service (GPRS) technology, the Enhanced Data rates for Global Evolution (EDGE) technology, the Wideband Code Division Multiple Access (WCDMA) technology, the Code Division Multiple Access 2000 (CDMA-2000) technology, the Time Division-Synchronous Code Division Multiple Access (TD-SCDMA) technology, the Worldwide Interoperability for Microwave Access (WiMAX) technology, the Long Term Evolution (LTE) technology, the LTE-Advanced (LTE-A) technology, the Time Division LTE (TD-LTE) technology, the fifth-generation (5G) New Radio (NR) technology, and others.

According to the 3rd Generation Partnership Project (3GPP) specifications and/or requirements in compliance with the 5G NR technology, an initial Non-Access Stratum (NAS) message may be sent in a partially protected format wherein only some of the Information Elements (IEs) are in cleartext (also called cleartext IEs or plaintext IEs) while other IEs are ciphered (also called ciphered IEs). However, the 3GPP does not specify which IEs of the partially protected NAS message are in cleartext, and there is no clear way to identify whether an IE is a ciphered IE or a cleartext IE when optional IE(s) is/are included. To further clarify, one or more of the cleartext IEs may be optional IE(s) and it/they may be located in the middle of other optional but ciphered IEs. As a result, it will be difficult to recognize from, ciphered data, what is/are optional cleartext IE(s) and what is/are ciphered IE(s).

BRIEF SUMMARY OF THE APPLICATION

In order to solve the aforementioned problem, the present application proposes specific message formats for an initial NAS message that is partially protected.

In a first aspect of the application, a User Equipment (UE) comprising a wireless transceiver and a controller is provided. The wireless transceiver is configured to perform wireless transmission and reception to and from a service network. The controller is configured to transition the UE from a Radio Resource Control (RRC) idle state to an RRC connected state, and after transitioning the UE from the RRC idle state to the RRC connected state, send an initial Non-Access Stratum (NAS) message comprising a limited set of Information Elements (IEs) in cleartext, which are required to establish security between the UE and the service network, and a container IE carrying an initial NAS message Protocol Data Unit (PDU) ciphered with NAS security context to the service network via the wireless transceiver.

In a second aspect of the application, a method for protection of an initial NAS message, executed by a UE communicatively connected to a service network, is provided. The method comprises the steps of: transitioning the UE from an RRC idle state to an RRC connected state; and after transitioning the UE from the RRC idle state to the RRC connected state, sending an initial NAS message comprising a limited set of IEs in cleartext, which are required to establish security between the UE and the service network, and a container IE carrying an initial NAS message PDU ciphered with NAS security context to the service network.

Other aspects and features of the present application will become apparent to those with ordinarily skill in the art upon review of the following descriptions of specific embodiments of the UEs and the methods for protection of an initial NAS message.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
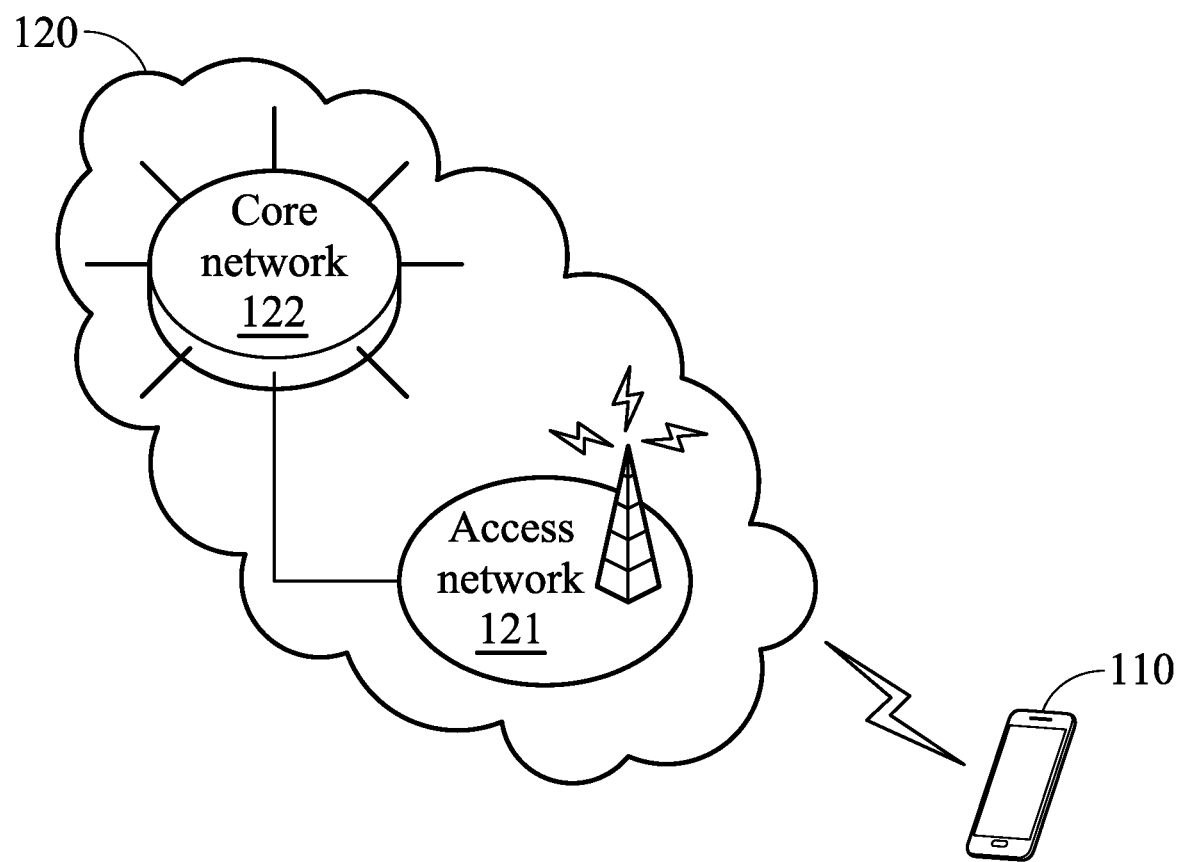
FIG. 1 is a block diagram of a wireless communication environment according to an embodiment of the application.

FIG. 1 is a block diagram of a wireless communication environment according to an embodiment of the application.

As shown in FIG. 1, the wireless communication environment 100 may include a User Equipment (UE) 110 and a service network 120, wherein the UE 110 may be wirelessly connected to the service network 120 for obtaining mobile services.

The UE 110 may be a feature phone, a smartphone, a panel Personal Computer (PC), a laptop computer, or any wireless communication device supporting the cellular technology (e.g., the 5G NR technology) utilized by the service network 120. In another embodiment, the UE 110 may support more than one cellular technology. For example, the UE may support the 5G NR technology and a legacy 4G technology, such as the LTE/LTE-A/TD-LTE technology, or the WCDMA technology.

The service network 120 may include an access network 121 and a core network 122. The access network 121 is responsible for processing radio signals, terminating radio protocols, and connecting the UE 110 with the core network 122. The core network 122 is responsible for performing mobility management, network-side authentication, and interfaces with public/external networks (e.g., the Internet). The access network 121 and the core network 122 may each comprise one or more network nodes for carrying out said functions.

In one embodiment, the service network 120 may be a 5G NR network, and the access network 121 may be a Radio Access Network (RAN) and the core network 122 may be a Next Generation Core Network (NG-CN).

A RAN may include one or more cellular stations, such as next generation NodeBs (gNBs), which support high frequency bands (e.g., above 24 GHz), and each gNB may further include one or more Transmission Reception Points (TRPs), wherein each gNB or TRP may be referred to as a 5G cellular station. Some gNB functions may be distributed across different TRPs, while others may be centralized, leaving the flexibility and scope of specific deployments to fulfill the requirements for specific cases.

A 5G cellular station may form one or more cells with different Component Carriers (CCs) for providing mobile services to the UE 110. For example, the UE 110 may camp on one or more cells formed by one or more gNBs or TRPs, wherein the cells which the UE 110 is camped on may be referred to as serving cells, including a Primary cell (Pcell) and one or more Secondary cells (Scells).

A NG-CN generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

It should be understood that the wireless communication environment 100 described in the embodiment of FIG. 1 are for illustrative purposes only and are not intended to limit the scope of the application. For example, the wireless communication environment 100 may include both a 5G NR network and a legacy network (e.g., an LTE/LTE-A/TD-LTE network, or a WCDMA network), and the UE 110 may be wirelessly connected to one or both of the 5G NR network and the legacy network.

Figure 2:
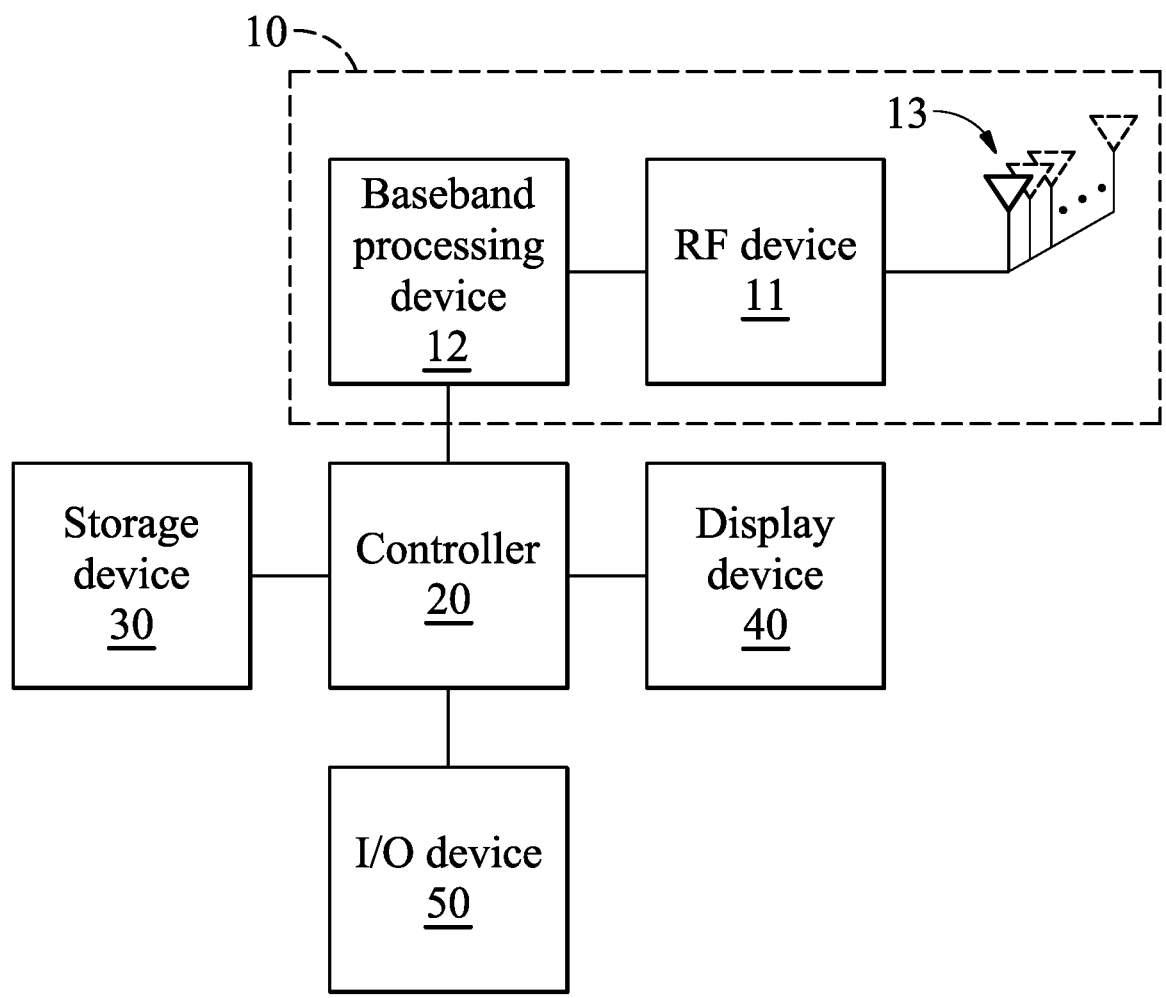
FIG. 2 is a block diagram illustrating the UE 110 according to an embodiment of the application.

FIG. 2 is a block diagram illustrating the UE 110 according to an embodiment of the application.

As shown in FIG. 2, the UE 110 may include a wireless transceiver 10, a controller 20, a storage device 30, a display device 40, and an Input/Output (I/O) device 50.

The wireless transceiver 10 is configured to perform wireless transmission and reception to and from the cells formed by one or more cellular stations of the access network 121.

Specifically, the wireless transceiver 10 may include a Radio Frequency (RF) device 11, a baseband processing device 12, and antenna(s) 13, wherein the antenna(s) 13 may include one or more antennas for beamforming.

The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 11 may receive RF wireless signals via the antenna(s) 13, convert the received RF wireless signals to baseband signals, which are processed by the baseband processing device 12, or receive baseband signals from the baseband processing device 12 and convert the received baseband signals to RF wireless signals, which are later transmitted via the antenna(s) 13. The RF device 11 may also contain multiple hardware devices to perform radio frequency conversion. For example, the RF device 11 may comprise a mixer to multiply the baseband signals with a carrier oscillated in the radio frequency of the supported cellular technologies, wherein the radio frequency may be any radio frequency (e.g., 30 GHz-300 GHz for mmWave) utilized in the 5G NR technology, or may be 900 MHz, 2100 MHz, or 2.6 GHz utilized in LTE/LTE-A/TD-LTE technology, or another radio frequency, depending on the cellular technology in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the cells formed by cellular station of the access network 121, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 for performing the method for protection of an initial NAS message.

In another embodiment, the controller 20 may be incorporated into the baseband processing device 12, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data (e.g., measurement configurations, DRX configurations, and/or measurement results), instructions, and/or program code of applications, communication protocols, and/or the method for protection of an initial NAS message.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, the UE 110 may include more components, such as a power supply, and/or a Global Positioning System (GPS) device, wherein the power supply may be a mobile/replaceable battery providing power to all the other components of the UE 110, and the GPS device may provide the location information of the UE 110 for use by some location-based services or applications. Alternatively, the UE 110 may include fewer components. For example, the UE 110 may not include the display device 40 and/or the I/O device 50.

Figure 3:
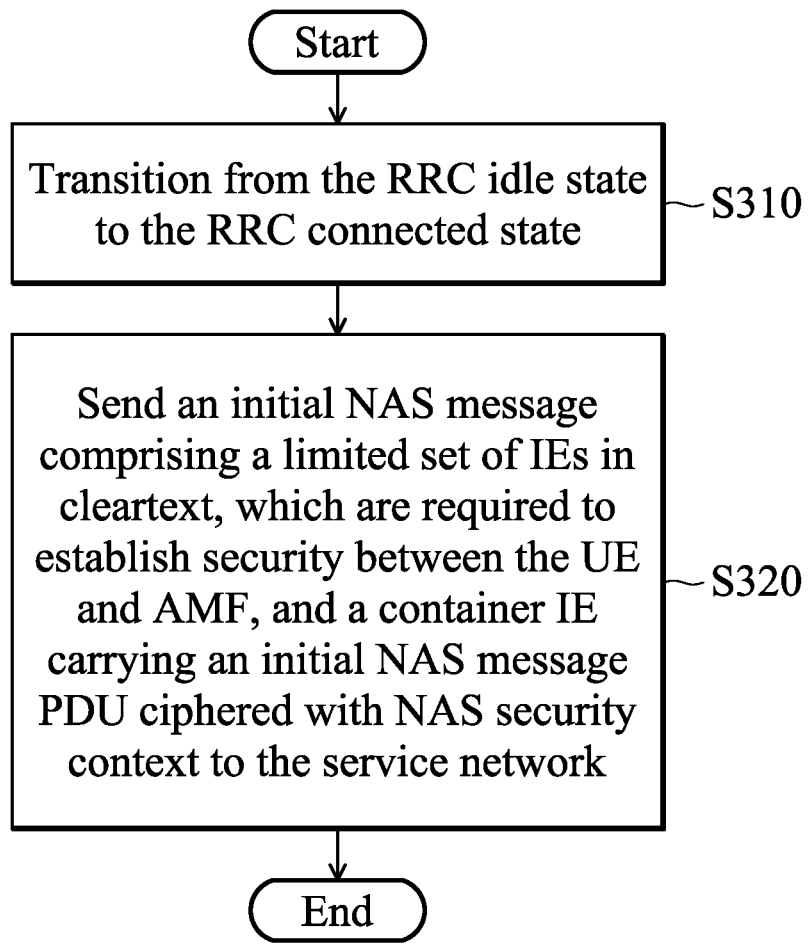
FIG. 3 is a flow chart illustrating the method for protection of an initial NAS message according to an embodiment of the application.

FIG. 3 is a flow chart illustrating the method for protection of an initial NAS message according to an embodiment of the application.

In this embodiment, the method for protection of an initial NAS message is applied to and executed by a UE (e.g., the UE 110) communicatively connected to a service network (e.g., the service network 120).

To begin with, the UE transitions from the Radio Resource Control (RRC) idle state to the RRC connected state (step S310).

The UE may perform an RRC connection establishment procedure with the service network, so as to connect to the service network for upper-layer tasks, such as NAS signaling. Upon successful completion of the RRC connection establishment procedure, the UE may transition from the RRC idle state to the RRC connected state.

Next, after transitioning from the RRC idle state to the RRC connected state, the UE sends an initial NAS message comprising a limited set of Information Elements (IEs) in cleartext, which are required to establish security between the UE and AMF, and a container IE carrying an initial NAS message Protocol Data Unit (PDU) ciphered with NAS security context to the service network (step S320), and the method ends.

Please note that, unlike the conventional format of an initial NAS message, the initial NAS message of the present application further include a container IE which is a newly introduced IE to contain the initial NAS message. Specifically, the initial NAS message PDU includes the limited set of IEs and all other IEs defined for an initial NAS message. Thus, it is clear that within an initial NAS message, only the content part (not including the header part) of the container is ciphered while all other IEs (i.e., the aforementioned limited set of IEs) are in cleartext.

In one embodiment, if the UE has no NAS security context upon initiating the transmission of an initial NAS message, it may first send an initial NAS message including only the limited set of IEs in cleartext to the service network. After that, during a NAS security control procedure, the UE may include the initial NAS message (i.e., the initial NAS message in step S320) in a NAS Security Mode Complete message to the service network.

In another embodiment, if the UE has a NAS security context upon initiating the transmission of an initial NAS message, it may send the initial NAS message (i.e., the initial NAS message in step S320) prior to a NAS security mode control procedure, or include the initial NAS message (i.e., the initial NAS message in step S320) in a NAS Security Mode Complete message in response to receiving a NAS Security Mode Command requesting the UE to send an initial NAS message.

In addition to the newly introduced container IE, the initial NAS message may have a 5G System (5GS) NAS message type indicating that the initial NAS message is a partially ciphered 5GS NAS message.

For example, according to the 3GPP TS 24.501, v0.3.1, the conventional types of initial NAS messages include plain 5GS NAS messages and security protected 5GS NAS messages, wherein a plain 5GS NAS message refers to an initial NAS message not security protected (i.e., all contents are in cleartext) and a security protected 5GS NAS message refers to an initial NAS message with all contents thereof ciphered and/or integrity protected. In addition to the conventional types of initial NAS messages, the present application proposes to add a new 5GS NAS message type, e.g., "Partially ciphered 5GS NAS message", to refer to initial NAS messages wherein only partial contents are ciphered.

Alternatively, the initial NAS message may have a security header type indicating that the initial NAS message is integrity protected and partially ciphered.

For example, according to the 3GPP TS 24.501, v0.3.1, the conventional security header types of initial NAS messages include plain NAS messages and security protected NAS messages, wherein a plain NAS message refers to an initial NAS message not security protected (i.e., all contents are in cleartext) and a security protected NAS message refers to an initial NAS message with all contents thereof integrity protected and/or ciphered. In addition to the conventional security header types, the present application proposes to add a new security header type, e.g., "Integrity protected and partially ciphered", to refer to initial NAS messages with only a part of the contents thereof ciphered.

Figure 4:
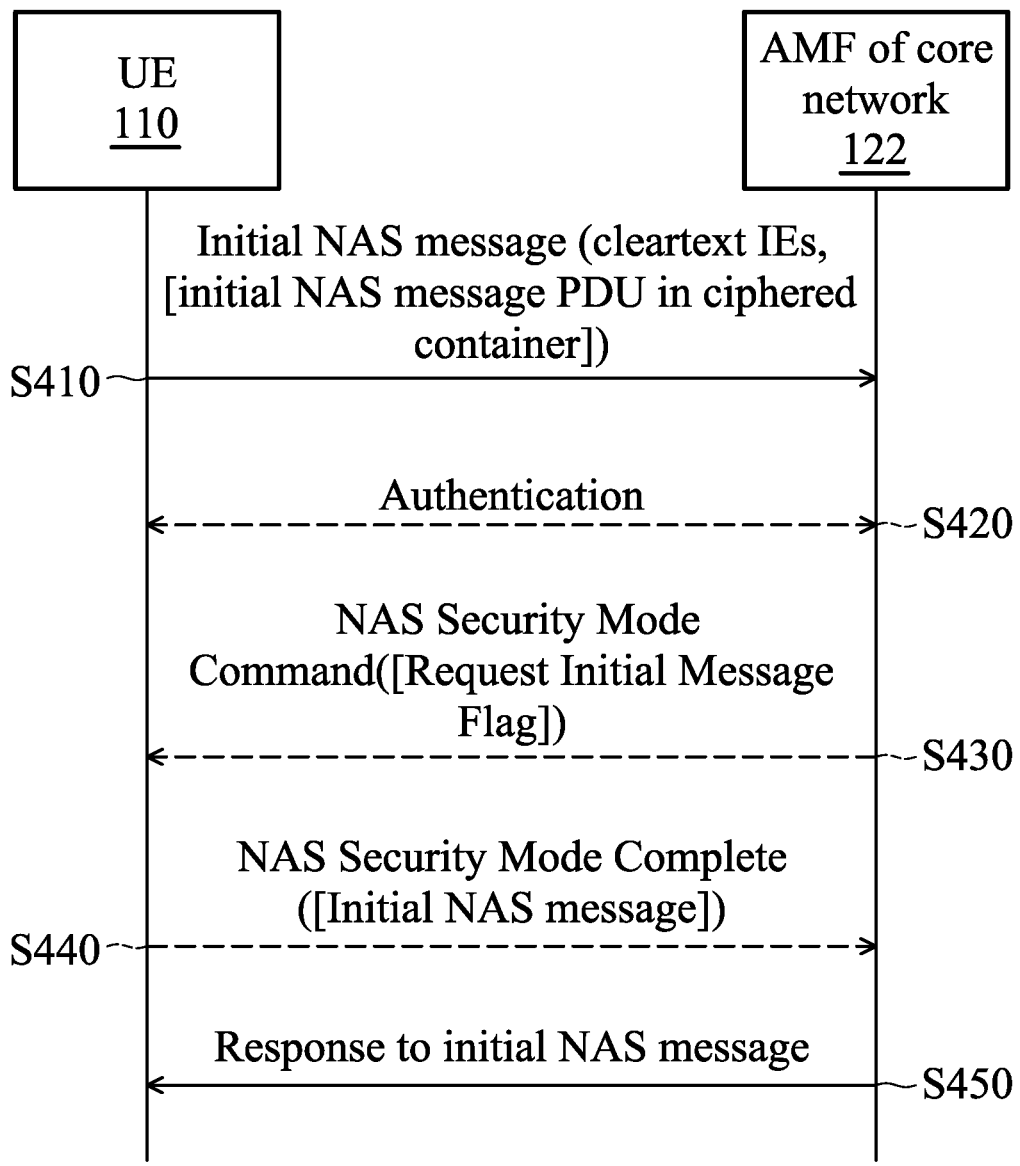
FIG. 4 is a message sequence chart illustrating protection of an initial NAS message according to an embodiment of the application.

FIG. 4 is a message sequence chart illustrating protection of an initial NAS message according to an embodiment of the application.

To begin with, the UE 110 sends an initial NAS message to the AMF of the core network 122 (step S410). Specifically, the initial NAS message refers to the first NAS message that is sent after the UE 110 transitions from the Radio Resource Control (RRC) idle state to the RRC connected state.

In one embodiment, when the UE 110 has no NAS security context, the initial NAS message may only include a limited set of IEs in cleartext, which are required to establish security between the UE and AMF (the limited set of IEs may be referred to as cleartext IEs herein).

The cleartext IEs may include the subscription identifiers (e.g. SUbscription Concealed Identifier (SUCI) or Globally Unique Temporary UE Identity (GUTI)), UE security capabilities, ngKSI, indication that the UE is moving from Evolved Packet Core (EPC), Additional GUTI, and IE containing the Tracking Area Update (TAU) Request in the case idle mobility from LTE.

In another embodiment, when the UE 110 has a NAS security context, the initial NAS message may include the limited set of IEs required to establish security in cleartext and a container IE ciphered with the current NAS security context, wherein the container IE carries the initial NAS message PDU which includes the limited set of IEs and all other IEs defined for an initial NAS message.

Next, if the AMF of the core network 122 is not able to find the NAS security context locally or from the last visited AMF (the AMF that is last visited by the UE 110), or if the integrity check of the received initial NAS message fails, then the AMF may initiate an authentication procedure with the UE 110 (step S420).

After a successful authentication with the UE 110, the AMF may send a NAS Security Mode Command message to the UE 110 (step S430).

In one embodiment, the NAS Security Mode Command message may include a flag requesting the UE 110 to send the initial NAS message in the NAS Security Mode Complete message, if the initial NAS message in step S410 was protected but did not pass the integrity check (due to either a MAC failure or the AMF not being able to find the used security context) or if the AMF could not decrypt the initial NAS message PDU in the container IE.

Subsequently, the UE 110 may send a NAS Security Mode Complete message to the AMF in response to receiving the NAS Security Mode Command message with a flag requesting the initial NAS message (step S440).

The NAS Security Mode Complete message is ciphered and integrity protected. Furthermore, the NAS Security Mode Complete message may include the initial NAS message in a container IE if either requested by the AMF or the UE 110 sent the initial NAS message unprotected.

Please note that steps S420 to S440 are optional (i.e., steps S420 to S440 are present only in certain situations as described above).

The AMF may use the initial NAS message that is in the container (either in step S410 or S440) as the message to respond to. The AMF may send its response to the Initial NAS message (step S450). This response message may be ciphered and integrity protected.

The initial NAS message described in the present application may be a REGISTRATION REQUEST message or a SERVICE REQUEST message for 5G systems. Taking the REGISTRATION REQUEST message as an example, the message format in compliance with the present application is shown below in table 1.

TABLE 1

| IEI | Information Element | Type/Reference | Presence | Format | Length |
|---|---|---|---|---|---|
|  | Extended protocol discriminator | Extended Protocol discriminator 9.2 | M | V | 1 |
|  | Security header type | Security header type 9.3 | M | V | ½ |
|  | Spare half octet | Spare half octet 9.5 | M | V | ½ |
|  | Registration request message identity | Message type 9.7 | M | V | 1 |
|  | 5GS registration type | 5GS registration type 9.8.3.6 | M | V | 1 |
|  | ngKSI | NAS key set identifier 9.8.3.22 | M | V | 1 |
|  | 5GS mobile identity | 5GS mobile identity 9.8.3.3 | M | LV-E | TBD |
| 2E | UE security capability | UE security capability 9.8.3.48 | O | TLV | 4-6 |
| 77 | Additional GUTI | 5GS mobile identity 9.11.3.4 | O | TLV-E | 14 |
| 2B | UE status | UE status 9.11.3.56 | O | TLV | 3 |
| xy | Ciphered IEs | Ciphered IE container xx.xx.xx.xx | O | TLV-E | 3-n |

As shown in table 1, all IEs except the ciphered IE container are cleartext IEs. Thus, it is easy to distinguish the cleartext IEs from the ciphered IEs.

The detailed format of the ciphered IE container is further illustrated below in table 2.

TABLE 2

| 8 | 7 | 6 | 5 | 4 | 3 | 2 | 1 | |
|---|---|---|---|---|---|---|---|---|
| Ciphered IE container IEI ||||||||octlet 1|
| Length of ciphered IE container contents ||||||||octlet 2<br>octlet 3|
| Ciphered container contents ||||||||octlet 4<br>octlet n|

As shown in table 2, only the content part of the ciphered IE container is ciphered while the header part (i.e., the IEI and length fields) of the ciphered IE container is in cleartext.

The detailed format of the ciphered container contents is further illustrated below in table 3.

TABLE 3

| IEI | Information Element | Type/Reference | Presence | Format | Length |
|---|---|---|---|---|---|
| | Extended protocol discriminator | Extended Protocol discriminator 9.2 | M | V | 1 |
| | Security header type | Security header type 9.3 | M | V | ½ |
| | Spare half octet | Spare half octet 9.5 | M | V | ½ |
| | Registration request message identity | Message type 9.7 | M | V | 1 |
| | 5GS registration type | 5GS registration type 9.8.3.6 | M | V | 1 |
| | ngKSI | NAS key set identifier 9.8.3.22 | M | V | 1 |
| | mobile identity | 5GS mobile identity 9.8.3.3 | M | LV | TBD |
| 55 | Nonce$_{UE}$ | Nonce 9.8.3.27 | O | TV | 5 |
| 10 | 5GMM capability | 5GMM capability 9.8.3.1 | O | TLV | 4-15 |
| 2E | UE security capability | UE security capability 9.8.3.48 | O | TLV | 4-6 |
| 2F | Requested NSSAI | NSSAI 9.8.3.28 | O | TLV | 4-74 |
| 52 | Last visited registered TAI | 5GS tracking area identity 9.8.3.44 | O | TV | 6 |
| 30 | S1 UE network capability | S1 UE network capability 9.8.3.36 | O | TV | 6-13 |
| 40 | Uplink data status | Uplink data status 9.8.2.3 | O | TLV | 4 |
| 50 | PDU session status | PDU session status 9.8.2.2 | O | TLV | 4 |
| B- | MICO indication | MICO indication 9.8.3.21 | O | TV | 1 |
| 2B | UE status | UE status 9.8.3.49 | O | TLV | 3 |
| 2C | Additional GUTI | 5GS mobile identity 9.8.3.3 | O | TLV | TBD |
| 2D | NSSAI info for PDU sessions | NSSAI info for PDU sessions 9.8.3.29 | O | TLV | 6-90 |
| C- | SMS requested | SMS requested 9.8.3.41 | O | TV | 1 |

The detailed description regarding all IEs except the container in the REGISTRATION REQUEST message is omitted herein for brevity since it is beyond the scope of the present application, and reference may be made to the 3GPP TS 24.501, v0.3.1.

In view of the forgoing embodiments, it should be appreciated that the present application proposes specific message formats for an initial NAS message that is partially protected, allowing the network side to recognize, from ciphered data, what is/are cleartext IE(s) and what is/are ciphered IE(s) within an initial NAS message. Therefore, the problems regarding decoding an initial NAS message can be solved.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A User Equipment (UE), comprising:
   a wireless transceiver, configured to perform wireless transmission and reception to and from a service network; and
   a controller, configured to transition the UE from a Radio Resource Control (RRC) idle state to an RRC connected state, and after transitioning the UE from the RRC idle state to the RRC connected state, send an initial Non-Access Stratum (NAS) message comprising a limited set of Information Elements (IEs) in cleartext, which are required to establish security between the UE and the service network, and a container IE carrying an initial NAS message Protocol Data Unit (PDU) ciphered with NAS security context to the service network via the wireless transceiver.

2. The UE of claim 1, wherein the initial NAS message PDU comprises the limited set of IEs and all other IEs defined for the initial NAS message.

3. The UE of claim 1, wherein the initial NAS message is included in a NAS Security Mode Complete message, and after transitioning the UE from the RRC idle state to the RRC connected state and prior to sending the initial NAS message, the controller is further configured to send another initial NAS message comprising only the limited set of IEs in cleartext to the service network via the wireless transceiver in response to the UE not having the NAS security context.

4. The UE of claim 1, wherein the initial NAS message is sent prior to a NAS security mode control procedure in response to the UE having the NAS security context, or the initial NAS message is included in a NAS Security Mode Complete message in response to receiving a NAS Security Mode Command requesting the UE to send an initial NAS message.

5. The UE of claim 1, wherein the initial NAS message has a security header type indicating that the initial NAS message is integrity protected and partially ciphered.

6. The UE of claim 1, wherein the initial NAS message has a 5G System (5GS) NAS message type indicating that the initial NAS message is a partially ciphered 5GS NAS message.

7. The UE of claim 1, wherein the initial NAS message is a Registration Request message or a Service Request message for a 5G system.

8. A method for protection of an initial Non-Access Stratum (NAS) message, executed by a UE communicatively connected to a service network, the method comprising:
   transitioning the UE from a Radio Resource Control (RRC) idle state to an RRC connected state; and
   after transitioning the UE from the RRC idle state to the RRC connected state, sending an initial NAS message comprising a limited set of Information Elements (IEs) in cleartext, which are required to establish security between the UE and the service network, and a container IE carrying an initial NAS message Protocol Data Unit (PDU) ciphered with NAS security context to the service network.

9. The method of claim 8, wherein the initial NAS message PDU comprises the limited set of IEs and all other IEs defined for the initial NAS message.

10. The method of claim 8, wherein the initial NAS message is included in a NAS Security Mode Complete message, and the method further comprises:
   after transitioning the UE from the RRC idle state to the RRC connected state and prior to sending the initial NAS message, sending another initial NAS message comprising only the limited set of IEs in cleartext to the service network in response to the UE not having the NAS security context.

11. The method of claim 8, wherein the initial NAS message is sent prior to a NAS security mode control procedure in response to the UE having the NAS security context, or the initial NAS message is included in a NAS Security Mode Complete message in response to receiving a NAS Security Mode Command requesting the UE to send an initial NAS message.

12. The method of claim 8, wherein the initial NAS message has a security header type indicating that the initial NAS message is integrity protected and partially ciphered.

13. The method of claim 8, wherein the initial NAS message has a 5G System (5GS) NAS message type indicating that the initial NAS message is a partially ciphered 5GS NAS message.

14. The method of claim 8, wherein the initial NAS message is a Registration Request message or a Service Request message for a 5G system.

* * * * *